April 1, 1947.  E. A. F. PRESSER  2,418,315
FLEXIBLE SHOCK ABSORBING POWER COUPLING
Filed Aug. 13, 1943  3 Sheets-Sheet 1
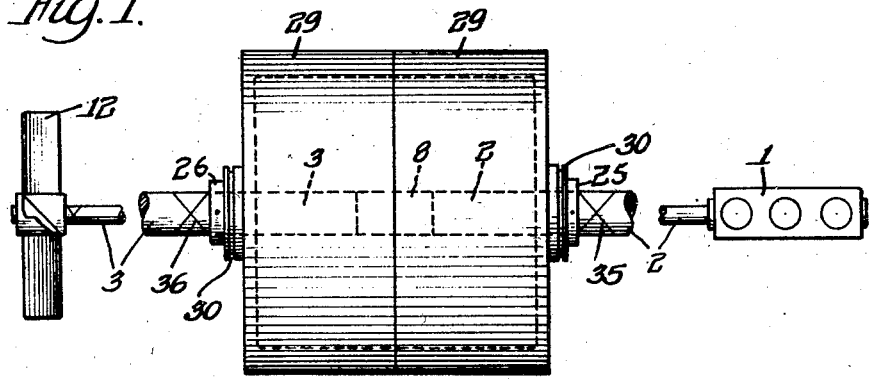
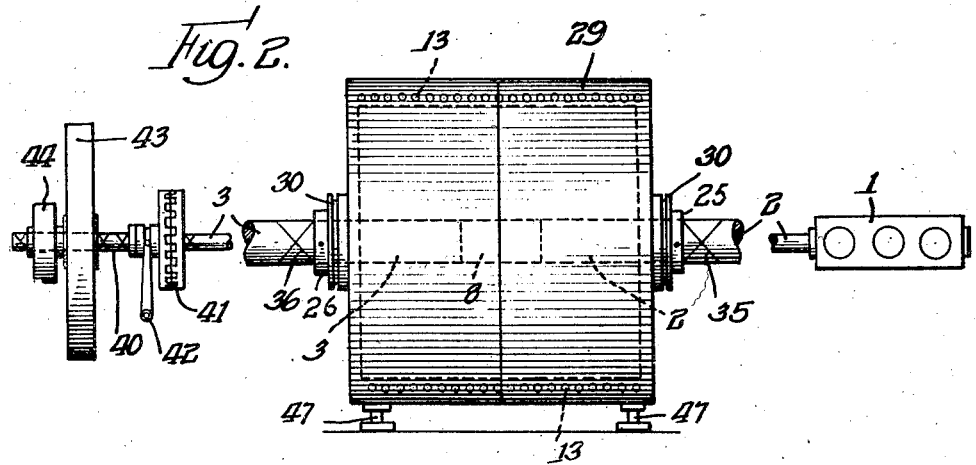
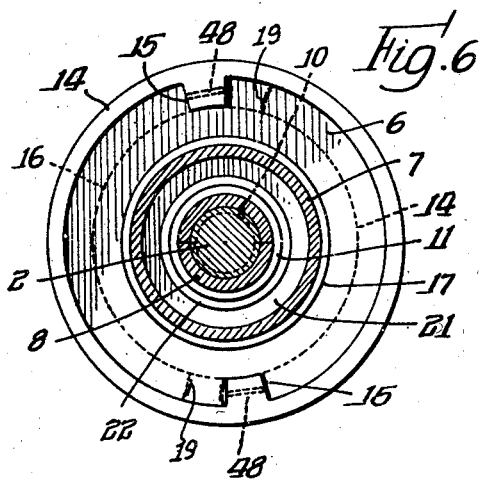
Eric A. F. Presser INVENTOR.
BY N. S. Amstutz
Attorney

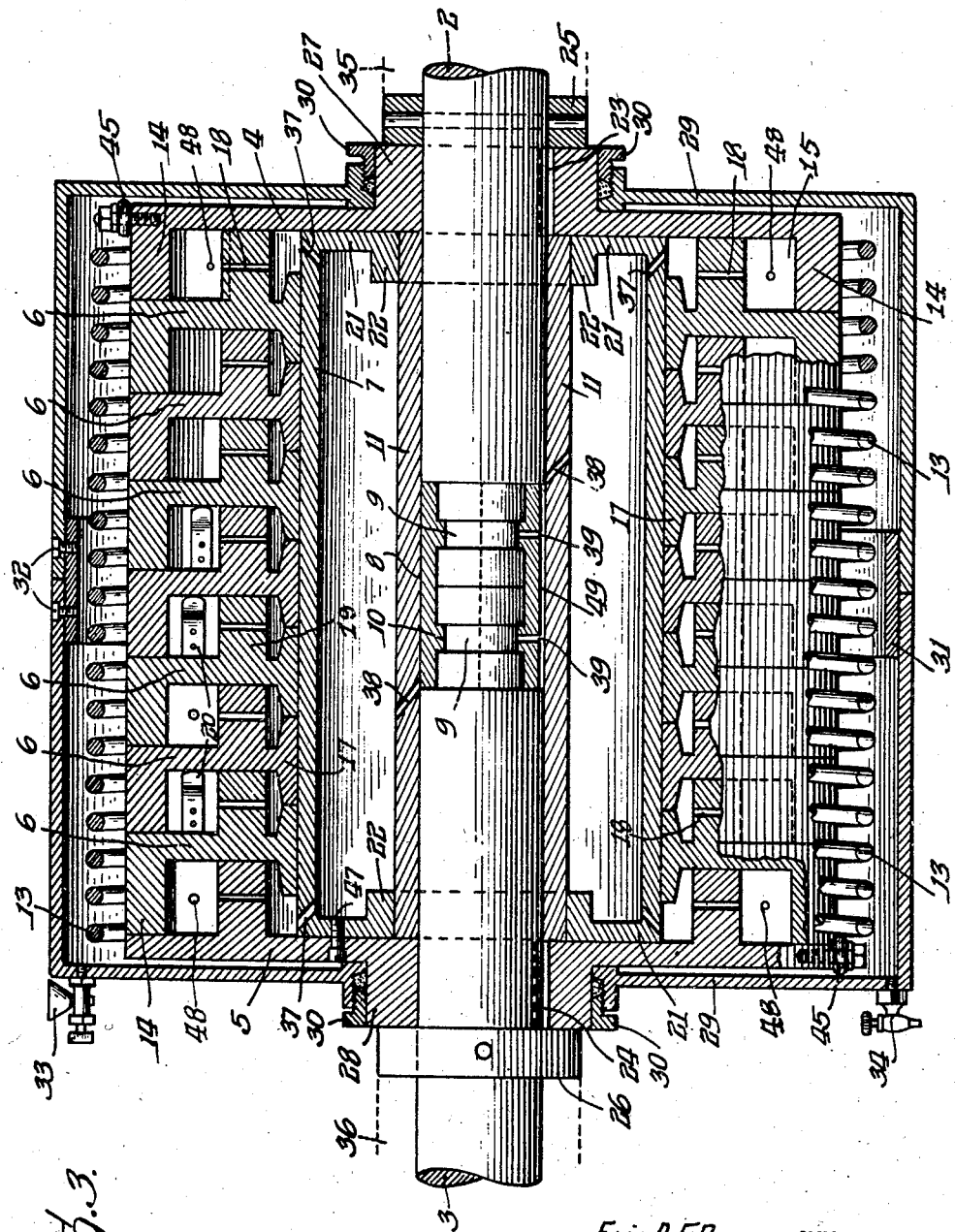

Eric A. F. Presser INVENTOR.

Patented Apr. 1, 1947

2,418,315

UNITED STATES PATENT OFFICE 2,418,315

FLEXIBLE SHOCK ABSORBING POWER COUPLING

Eric A. F. Presser, East Chicago, Ind.

Application August 13, 1943, Serial No. 498,448

4 Claims. (Cl. 64—27)

1

My invention relates to improvements in flexible shock-absorbing power coupling and it especially consists of the features pointed out in the claims.

The purpose of my invention is to provide a power coupling that is flexible and automatically adaptable to variations of intermittent motions; that the flexibility is due to the use of an external coil spring of sufficient cross section and length and the cooperation of the hydromatic effect present through the use of oil or any other available liquid which fills all the open spaces within an enclosing casing; that because of these characteristics it eliminates the breakages that are not infrequent in the crankshafts of triple expansion marine engines due to very sudden changes of load; that on account of the shock absorbing features there is stored up some of the energy expended in overcoming the retardations of the shock automatically returned to the system; and that is quite simple in its construction and operation.

With these and other related purposes in view I illustrate in the accompanying drawings such instances of adaptation as will show the broad features of the invention without limiting myself to the specific details shown thereon and described herein.

Fig. 1 is a diagrammatic view showing the invention associated with a ship's propeller.

Fig. 2 is a view similar to Fig. 1 showing the invention in connection with an intermittent power service through a clutch.

Fig. 3 is an elevation in lengthwise section throughout the entire structure.

Fig. 6 is a reduced size elevation of the rim face of one of the floating disks.

Fig. 7 is a combined side and end elevation of a two-piece sleeve for holding the driving and the driven shafts as assembled end to end.

Figure 4:
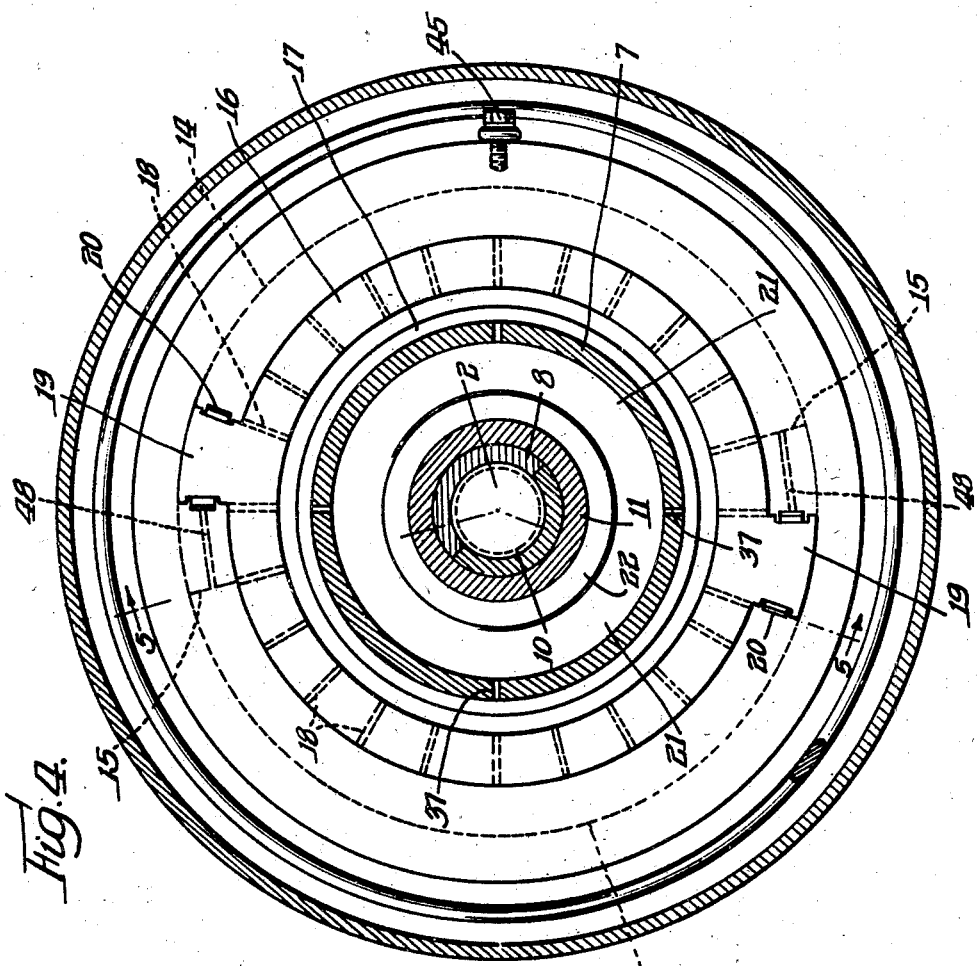
Fig. 4 is an end elevation, partly in section, of Fig. 2.
Figure 5:
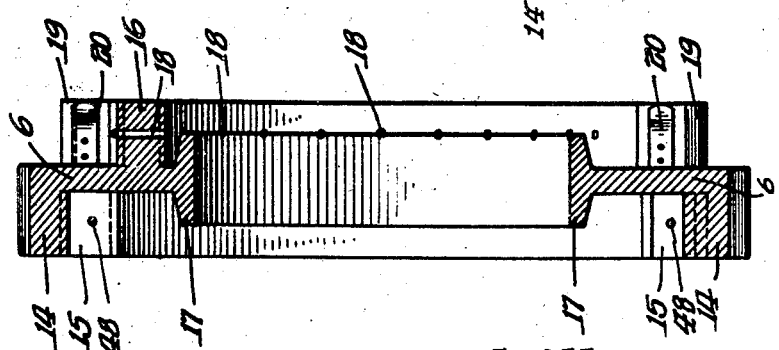
Fig. 5 is an elevation in section of one of the floating disks, projected from the adjacent Fig. 4.

In using my device I may employ whatever changes or modifications in structure that the exigencies of varying conditions may demand without departing from the broad spirit of the invention.

This invention is especially adapted wherever power is transmitted intermittently or under wide variations of uniformity. The latter condition is usually found in the case of ocean or other vessels that must traverse stormy seas which recurrently cause the ships propeller to be entirely out of the water as the ship is on the crest of a wave and the next moment the racing propeller thrust into the water with its attendant shock, endangering the crankshaft of the steam engine.

A source of power is indicated diagrammatically on Figs. 1 and 2 at 1. It is connected to the device by a shaft 2. This shaft is connected to the driven shaft 3 by a split sleeve 8 so that the two separate shafts are always held in an end to end approximate engagement with each other. The sleeve 8 is in two parts. It has two inner flanges 10 that enter corresponding grooves 9 in the respective shafts. The sleeve 8 is held in place by a long aligning sleeve 11 that extends from the right-hand end disk 4 to the left-hand end disk 5.

Between the disks 4 and 5 there are a number of duplicate members 6 which I have named, floating disks. They ride loosely on a cylinder or barrel 7 which has end portions 21 joined to inwardly projecting hubs 22. These hubs rest on the aligning sleeve 11. Against the ends of the sleeve 11 and against the ends 21 of the barrel 7, end disks 4 and 5 are placed. The disks 4 and 5 have enlarged projecting hubs 27 and 28 respectively. A collar 25 on the shaft 2 and a collar 26 on the shaft 3 hold all the parts in endwise relation. The end disk 4 is keyed to shaft 2 by a key 23 and the end disk 5 is keyed to the shaft 3 by a key 24. The disk 4 has a side projecting rim 14 similar to the rims 14 on each one of the floating disks 6. The disk 5 has an inwardly projecting annular hub 16 like the hubs 16 on each one of the floating disks 6. Beneath the rims 14 there are radial teeth 15. On each disk the teeth 15 are diametrically opposite each other. Each one of the disks 6 has a small seating hub 17 projecting from each of its faces. These "feet" are annular and they rest on the barrel 7. Within the limits of the teeth 15 and 19 they may be rotated.

The set of radial teeth, 19 project outward from the annular hub 16. These teeth are the same distance from the shaft center as the teeth 15 and they are similarly disposed in diametrical relation to each other. Each one of these teeth is provided on its two engaging faces with cushioning springs 20. Oil channels 18 are formed radially through the hub 16.

A large coil spring 13 is attached at its ends to the end disks 4 and 5 by any desired fastening means at 45. This spring is only under partial tension as the first motion is imparted to the shaft 2 by the prime mover 1. It does not come into full tension unless all the teeth 15 and 19 of all the disks 6 are in engagement.

The shafts 2 and 3 are held together end to end by the two-part sleeve 8 as described above. The sleeve 8 is first applied to the shafts, then the aligning sleeve 11 is slipped over it, the ends 4 and 5 are then assembled on their keys and the collars 25 and 26 are placed against the ends 4 and 5 where they are held on the shafts by through pins or otherwise. The entire assembly is enclosed by an external casing 29. This is made in two parts, which may be duplicates of each other. Both parts may have internal threads which are engaged by an inner ring 31 which after the outer casings have been assembled on it, set screws 32 hold the parts against separation. There is a filling attachment 33 and a controlled outlet 34. On the outside of the collars 25 and 26 bearings 35 and 36 are positioned. These are shown diagrammatically on Fig. 3, by conventional diagonal lines.

The entire inside of the device is filled with oil and to provide circulation, channels 37 are formed near the ends of the barrel 7, on its outer surface. Similarly channels 38 are formed in the sleeve 11 and channels 39 and 49 are also formed in the split sleeve 8.

When the device is applied to ship service the usual propeller 12 is secured to the outer end of the shaft 3, with the usual conventional bearings secured to the hull of the ship. To prevent the leakage of oil from the inside of the casing 29 external stuffing boxes 30 are provided with the usual glands, packing etc.

When the device is used in conjunction with an intermittent power demand a clutch 41 on the outboard shaft 40 connects it to the shaft 3. A clutch control lever 42 is used to engage and disengage the clutch. This relation of the parts is for intermittent motion and a fly wheel 43 is placed on the shaft 40 for the purpose of using its inertia to drive momentarily the driver, creating an instant of neutrality, the energy is used to recoil the shock absorber spring and reduce the kinetic movement of the power source. On the same shaft a pulley 44 may be placed or any other means for conveying power from the shaft 40 for any purpose whatever.

If desired the left-hand end member 5 may be bolted to the barrel 7 by screws 46, and if found desirable the casing 29 may have external supporting feet 47.

The radial teeth 15 under the rims 14 have a chordal oil channel 48 which communicate with adjacent radial channels 18 in the hub 16 and a second radial channel 18, adjacent the other side of each radial tooth 19.

The oil between the teeth 15 and 19 acts as a cushion between these faces in addition to the cushioning effect of the springs 20. In order that the split sleeve or coupling 8 shall be amply lubricated oil holes 39 lead into the grooves 9 of the shafts 2 and 3. A lengthwise channel 49 is made in the surface of one or both parts 8. This connects with the channels 39 and the channels 38 formed through the wall of the sleeve 11.

The several parts of my device cooperate as follows. When the driving shaft 2 is rotated it carries with it the end disk 4 that is keyed thereon or secured in any other manner. It is immaterial whether the engine is first driving the shaft 2 or the shaft 3, even though they have been designated as the driver 2 and the driven shaft 3. As the disk 4 rotates it picks up the tooth 19 by its own tooth 15. The tooth 19 is on the immediately adjacent floating disk 6 and the same disk also has a tooth 15 on its opposite side, under the rim 14. All of the disks are duplicates. The disk 4 has a rim 14 and teeth 15 but not teeth 19 while the disk 5 does not have a rim 14, but has the hub 16 and on it does have the teeth 19.

The disks 6 are successively picked up one after another and when the end disk 5 is picked up all the disks are moving as a unit the coil spring 13 secured to the disk 4 by a fastening 45 is put under tension due to its being secured to the end disk 5 by a similar fastening 45. The spring is put under tension to an initial degree as soon as the disk 4 starts to move. Due to the storing up of energy in the spring a ship's propeller will momentarily rotate independently, ahead of the R. P. M. of the driving shaft due to the tension of the spring should it be suddenly lifted out of the water by the boat having reached the crest of the wave. As soon as the propeller again engages the water the cushioning effect of the spring and the hydromatic agency of the oil will take up the shock that would otherwise endanger the main shaft.

In the case of an intermittent motion, exemplified in Fig. 2 the load 44 being rather heavy and difficult to start easily the first shock of it is taken up by the spring, and the hydromatic effect of the oil movement between the teeth 15 and 19 and the energy stored in the spring is then automatically returned to the shafts 3 and 40. At any time that the load 44 is suddenly increased the engine 1 may continue at its rated speed because the spring 29 has taken up the extra load. It is for these reasons that my device is, in reality, an elastic shock absorbing power coupling.

Aside from the elastic connection there is the importance of my device serving as a shock absorber in any transmission line under sudden changes in load which in the absence of a mechanical and hydrostatic cushion would result in serious breakage. In the case of maritime uses it will be possible to speed up the movement of a vessel in stormy weather beyond the safe limits admissable in ordinary practice. It is believed that with my attachment, in cooperation with a conventional governor (not shown) it will no longer be necessary for the engineer to stand by his throttle to control the admission of steam to prevent the racing of the propeller each time the stern of his ship, at the crest of a wave, is out of water. But it is also believed that my device may be used in the automatic cooperation of a governor to control the steam admission above a certain speed limit of the propeller to, for a moment, completely shut off the steam until the R. P. M. is reduced below the limit set by the governor. Slight variations of R. P. M. in excess of the speed to which the governor is set, in the ensuing danger to the engine crank shaft will be offset by the shock absorber. It is of course well known that in extreme stormy weather speeds of ships are reduced very much which in the course of the shipment of war materials may seriously delay the receipt of critical war supplies where most needed.

What I claim is:

1. A shock absorbing power coupling which comprises a pair of shafts placed end to end for independent movement within prearranged limits, a plurality of flanged floating members positioned between end disks, a pair of end disks connected respectively one to each shaft, a coil spring external of all the floating members attached to the end disks, an enclosing casing for all the parts, and an oil supply within the casing to fill all the interstices between the parts and provide hydrostatic pressure as a further cushion between the moving members.

2. A disk adapted for power purposes comprising a central web, an external rim on the one side, a reduced diameter hollow hub on the other side of the web providing a fluid chamber therein, a pair of teeth in concentric diametrically opposite relation beneath the rim, a pair of teeth in concentric diametrically opposite relation on the outside of the reduced diameter hub, and oil circulating openings through the several teeth.

3. A plurality of adjacently positioned disks adapted for power purposes each disk comprising a central web, an external flange on the one side, a reduced diameter hollow hub on the other side of the web providing a fluid chamber therein, a pair of teeth in concentric diametrically opposite relation beneath the flange, a pair of teeth in concentric diametrically opposite relation on the outside of the reduced diameter hub, oil circulating openings through the several teeth, and a pair of end disks associated therewith, a continuous spring connected to the end disks and encircling the intermediate disks, a casing enclosing the spring and disks, and a central shaft to which the disks and the casing are concentric.

4. A shock absorbing coupling comprising a pair of disconnected shafts, an end disk attached to each shaft, a plurality of floating members between the end disks concentric with the shaft, a resilient member surrounding the disks having one end attached to one end disk and the other end attached to the other end disk, continuous flanges on each disk, a hub on each disk of approximately the same axial dimension as the flanges, a concentric barrel support for the interior diameter of the disks, a self aligning sleeve extending over the ends of the shafts between the end disks, a casing enclosing all the disks whereby the entire interior is sealed to contain lubricant and the entire space between the end disks is filled by the floating disks face to face against each other throughout their entire circumference.

ERIC A. F. PRESSER.

REFERENCES CITED

The following references are of record in the file of this patent:

UNITED STATES PATENTS

| Number | Name | Date |
|---|---|---|
| 1,422,929 | Cooke | July 18, 1922 |
| 1,630,737 | Flanders | May 31, 1927 |
| 2,307,187 | Anderson | Jan. 5, 1943 |
| 50,190 | Watson | Sept. 26, 1865 |
| 2,067,271 | Johnson et al. | Jan. 12, 1937 |
| 2,133,050 | Simmons | Oct. 11, 1938 |
| 1,627,964 | Galloway | May 10, 1927 |
| 1,561,068 | Fine | Nov. 10, 1925 |